United States Patent [19]
Scheck et al.

[11] Patent Number: 5,590,562
[45] Date of Patent: Jan. 7, 1997

[54] MANUAL PASSIVE QUICK ADJUSTMENT DEVICE

[75] Inventors: Georg Scheck, Weitramsdorf; Carsten Brandt, Weidach; Markus Fischer, Coburg; Jürgen Angermüller, Mitwitz; Hans Rampel, Ahorn-Schorkendorf; Udo Dreher, Coburg, all of Germany

[73] Assignee: Brose Fahrzeugteile GmbH & Co. KG, Coburg, Germany

[21] Appl. No.: 313,355

[22] Filed: Sep. 27, 1994

[30] Foreign Application Priority Data

Nov. 12, 1993 [DE] Germany .......................... 43 38 737.3
Jun. 28, 1994 [DE] Germany .......................... 44 22 529.6

[51] Int. Cl.⁶ .............................. G05G 5/12; F16H 25/20
[52] U.S. Cl. ........................................... 74/89.14; 74/411.5
[58] Field of Search ................................... 74/411.5, 425, 74/89.14; 297/361.1, 362.14, 375; 403/103, 328

[56] References Cited

U.S. PATENT DOCUMENTS

| | | | |
|---|---|---|---|
| 2,991,830 | 7/1961 | Abel | 403/103 |
| 4,483,366 | 11/1984 | Labita | 137/385 |
| 4,534,534 | 8/1985 | Hess et al. | 248/424 |
| 4,589,301 | 5/1986 | Griner . | |
| 4,685,735 | 8/1987 | McFalls et al. | 297/362.14 |
| 4,805,961 | 2/1989 | Garrod | 297/362.14 X |
| 5,248,184 | 9/1993 | Morris | 297/362 |
| 5,295,730 | 3/1994 | Rees | 297/361.1 |

FOREIGN PATENT DOCUMENTS

| | | | |
|---|---|---|---|
| 2567462 | 1/1986 | France | 297/361.1 |
| 2449180 | 5/1975 | Germany . | |

*Primary Examiner*—Charles A. Marmor
*Assistant Examiner*—Troy Grabow
*Attorney, Agent, or Firm*—Christie, Parker & Hale, LLP

[57] ABSTRACT

A manual passive continuous action quick adjustment device for adjusting elements in or on motor vehicles without a separate drive unit comprises a worm rotatably disposed within a housing. The worm comprises a locking region that is configured to engage a locking element disposed within the housing. The worm comprises a toothed section that is threadably engaged with a toothed section of an oppositely oriented toothed segment lever that is connected to the particular device requiring adjustment. The locking region may comprise a circumferential groove near an end portion of the worm and the locking element may comprise a slide configured to accommodate frictional engagement with the groove. The locking region may comprise the front faces of the toothed section of the worm frictionally engaged by a slide. A second locking region may comprise front faces adjacent to ends of the worm frictionally engaged by edge portions of the housing upon radial displacement of the worm by activation of the slide. Alternatively, the toothed segment lever or worm itself may comprise an eccentric member that when activated causes either the lever or worm to be displaced towards one another to block rotational movement of the worm.

18 Claims, 6 Drawing Sheets

MANUAL PASSIVE QUICK ADJUSTMENT DEVICE

FIELD OF THE INVENTION

The invention relates to a manual quick adjustment device and, more particularly, to a manual quick adjustment device for adjusting elements in or on motor vehicles, the adjusting device employing a worm seated in a housing and engaging an oppositely oriented tooth element, wherein the worm has an area which can be brought into engagement with a locking element.

BACKGROUND OF THE INVENTION

U.S. Pat. No. 4,589,301 discloses an adjustment device having a linearly continuously setable mechanism for the relative positioning of components. The device comprises a linearly displaceable spindle connected with a subject to be adjusted (for example the backrest of a seat). One end of the spindle is seated in a bore of a housing and an opposite end of the spindle is seated in a bore of a cup-shaped union nut which is in rotatable connection with the housing via a thread. A spindle nut is rotatably seated on the spindle in a chamber formed by the housing and the union nut. The device has recesses on its front end which respectively partially receive a roller bearing with axially acting spring elements. Axial forces of the spindle are smoothly supported via these bearings and the spindle nut can turn easily when the device is operated.

The device is locked by screwing the spindle nut onto the stationary housing part, reducing the axial play of the spindle nut until its annular front faces rest against the housing or are jammed. Once the spindle nut is fixed into place, the spindle can no longer be displaced and the device is locked.

This device is costly to produce and expensive to purchase due to the use of two relatively expensive roller body bearings for supporting the spindle nut. Also, long adjustment paths lead to space problems, because a spindle of appropriate length must be employed.

An automatic self-locking device for rotating shafts is disclosed in German Patent Publication DT 24 49 180 A1, which also permits the continuous quick adjustment of parts. A solitary helical spring, split into two spring parts, is seated with pre-stress on a cylindrical shaft. The spring has several stops which cooperate with corresponding stops of a housing surrounding the spring. A movement of the spring, and thus an adjustment of the adjustable part, is possible when the spring is opened. In the locked state, however, a load on the spring can result in an automatic increase of locking.

This device, too, has the disadvantage of a relatively elongated construction because of the two-part spring. In addition, the elastic behavior of the spring results in the selected locked position being resilient instead of rigid.

It is therefore desirable that a quick adjustment device be constructed that is manually operable, passive, and has a continuous action. It is desired that the quick adjustment device be adapted in particular for adjustable components in motor vehicles, which is distinguished by a great compactness, a simple structural design (easy mounting of few components) and dependable operation.

SUMMARY OF THE INVENTION

There is, therefore, provided in the practice of this invention a manually operable passive continuous action quick adjustment device comprising a worm seated in a housing, the worm having a toothed section along the circumferential surface of the worm engaging the toothed section of an oppositely oriented toothed element, the toothed element being connected to a particular article requiring adjustment. The worm comprises a locking region disposed on the circumference capable of frictional engagement with a locking element disposed within the housing to prevent the unintended displacement of the worm, the toothed element and, thus the particular article.

The locking element can be embodied as a slide having wedge-shaped edges that frictionally engage complementary wedge-shaped edges of the locking region of the worm that is configured as a circumferential groove. The action of the locking element is controlled by an actuating member such as a lever or handle and the like. The slide can also be embodied as a bolt directed radially toward the locking region of the worm configured as a plurality of radial recesses, locking engagement between the slide and worm being accomplished by the insertion of the slide into one of the recesses.

The slide can also be embodied as a block configured to frictionally engage the toothed section of the worm. Additionally, the worm may comprise a second locking region at each conical front face that is placed into frictional engagement with adjacent edges of the housing by radial displacement of the worm caused by the engagement of the slide against the worm. Alternatively, an increased locking effect can be achieved by configuring the toothed section of the toothed element in such a manner to cause the toothed element to impose a radial force upon the worm, via engagement with the toothed section of the worm, upon radial displacement of the worm caused by the engagement of the slide.

The slide can also be embodied as an element of the device itself, rather than a separate locking element. The slide may be configured in the form of an eccentric member positioned between the toothed segment lever and a shaft used to pivotally attach the lever, that when activated pushes the toothed section of the toothed segment lever into the toothed section of the worm, thereby blocking rotational movement of the worm. The slide may be configured in the form of an eccentric member or members positioned between the worm and a shaft used to rotatably attach the worm, that when activated pushes the toothed section of the worm into the toothed section of the toothed segment lever.

BRIEF DESCRIPTION OF THE DRAWINGS

These features and advantages of the invention, as well as other features and advantages of the invention, will be more apparent from a reading of the claims and of the detailed description of the invention in conjunction with the drawings described below:

FIG. 1b is a semi-schematic plan view of an embodiment of a quick adjustment device taken along section A—A in FIG. 1a;

DETAILED DESCRIPTION

Figure 1A:
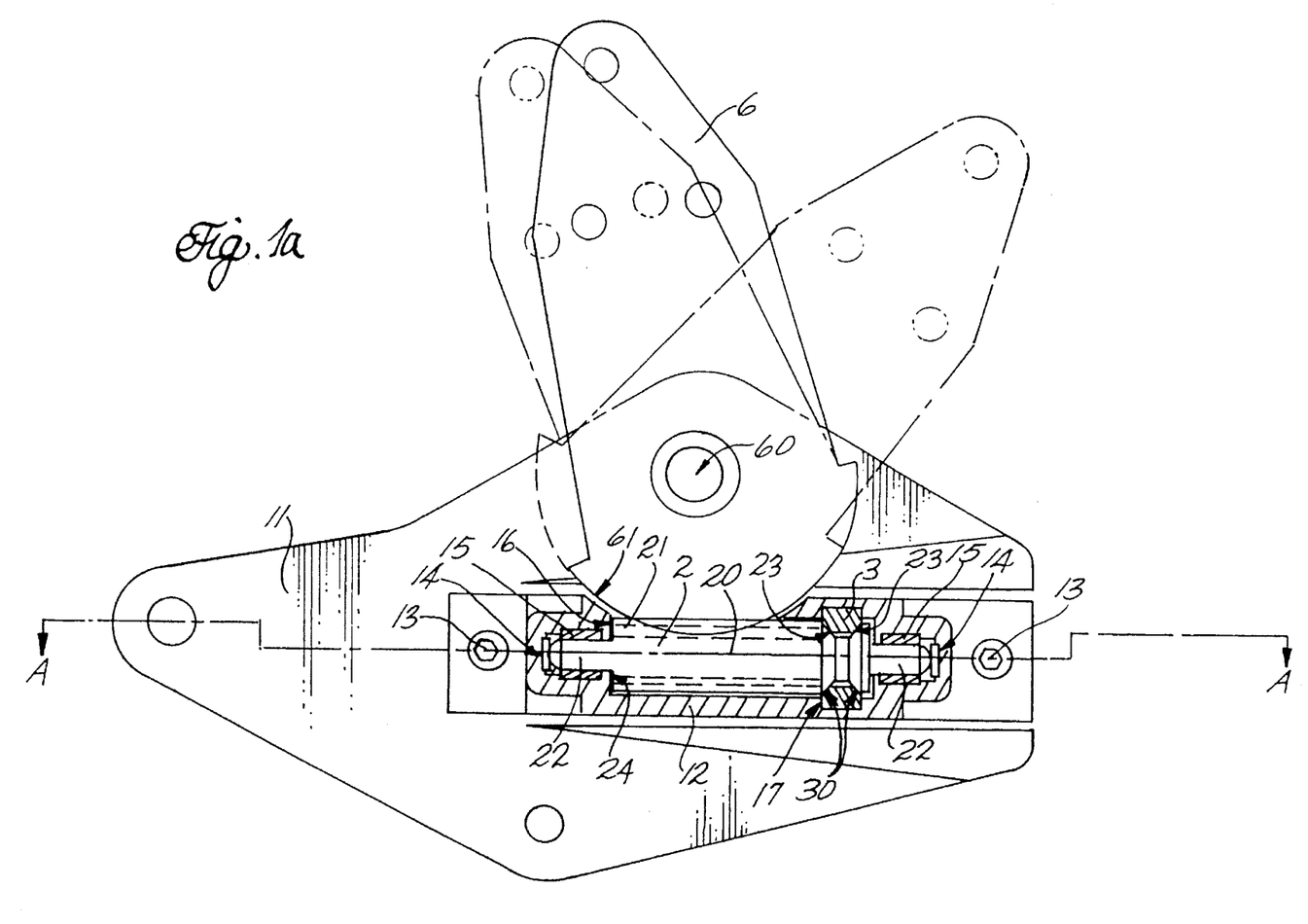
FIG. 1a is a semi-schematic side view of an embodiment of a quick adjustment device constructed according to principles of this invention for an adjustable seat of a motor vehicle.

An exemplary embodiment of a manually operable passive continuous action quick adjustment device is illustrated in FIG. 1a and comprises a base plate 11, a housing 12 fastened to the baseplate by screws 13, and a worm 2 seated in the housing 12. The worm is radially supported in the housing 12 by radial bearings 15 positioned adjacent opposing ends of the worm, and is axially supported in the housing by axial bearings 14 positioned between each end of the worm and an adjacent housing portion. The worm comprises a toothed section 21 that is placed into engagement with a toothed section 61 of a toothed segment lever 6 oriented opposite to the worm, the toothed sections 21 and 61 being in mutual engagement without self-locking. Accordingly, the worm 2 is free to rotate in its bearings 14 and 15 when a force is imposed on the toothed segment lever 6, causing the toothed section 61 to rotate around the shaft 60.

A locking region in the shape of a circumferential wedge-shaped groove formed by angularly disposed edges 23 is provided on a portion of the worm 2. A locking element embodied as a slide 3 is positioned within the housing 12 adjacent to the wedge-shaped groove of the worm. The slide comprises wedge-shaped edges 30 configured to complement angularly disposed edges to facilitate frictionally locking engagement therebetween.

The housing 12 can be embodied as a stamped or cast part that may comprise receivers (not shown) for seating the worm 2 and receivers (not shown) for guiding the movement of the slide 3. The toothed section 61 of the toothed segment lever 6 extends through an opening in the housing 12 and provides an interlocking engagement with the toothed section 21 of the worm. The toothed segment lever 6 can be connected to the particular article requiring adjustment, e.g., a backrest of a motor vehicle seat, and is pivotally connected on shaft 60 mounted to the base plate 11 which is attached to the bottom frame of the seat.

It is desired that the worm 2 be seated within the housing in such a manner to assure its freely moving adjustment. In accordance with the exemplary embodiment shown in FIG. 1a, radial bearings 15 as well as axial bearings 14 are provided and are positioned within the housing adjacent bearing journals 22 positioned at each end of the worm 2. The axial bearings 14, only indicated schematically, should be embodied to be resilient so as to be able to assure centering of the worm 2 within the housing and to prevent axial play in the housing 12. For example, the axial bearing 14 can be embodied as a U-shaped spring or it can comprise a hard alloy plate with a rubber washer.

It is important that the worm 2 be centered and remain centered during customary displacement forces to prevent contact between front faces 24 of the worm and adjacent support surfaces 16 in the housing 12. Contact between the front faces 24 and the support surfaces 16 would make the quick adjustment device stiff and difficult to operate. A desired adjustment movement might even be blocked, although the locking element (slide 3) is not activated. Only when unusually large forces must be reduced, for example in the case of a crash, is the frictional contact between the support surfaces 16 and the front faces 24 intended to provide additional protection against undesired displacement of worm 2, and thus the toothed segment lever 6, besides blocking by the slide 3.

Figure 1B:
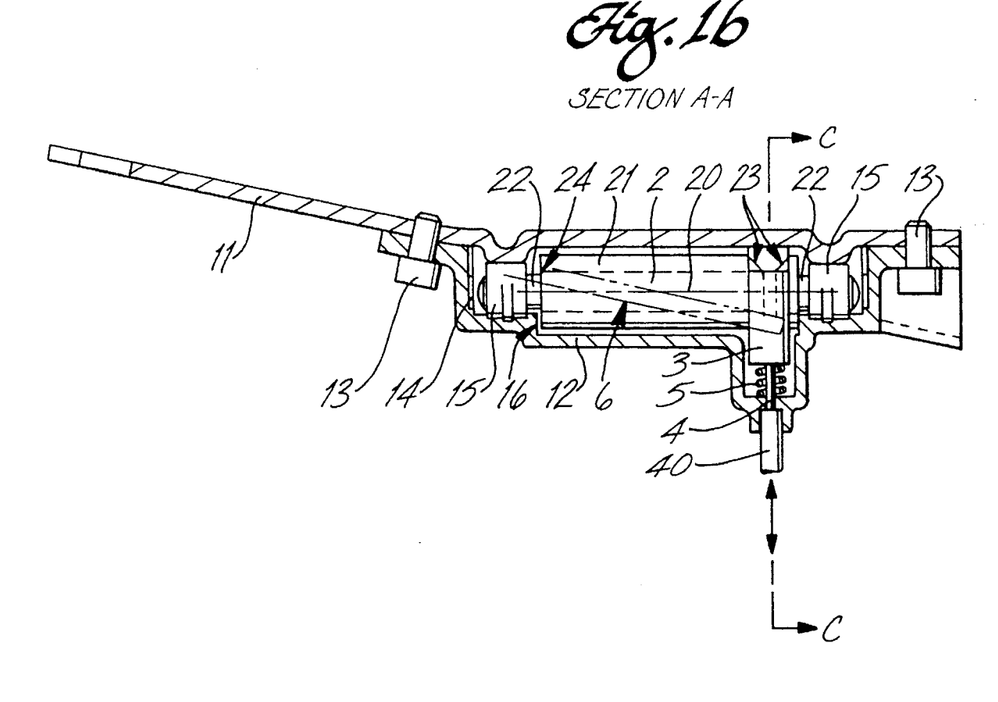
Figure 1C:
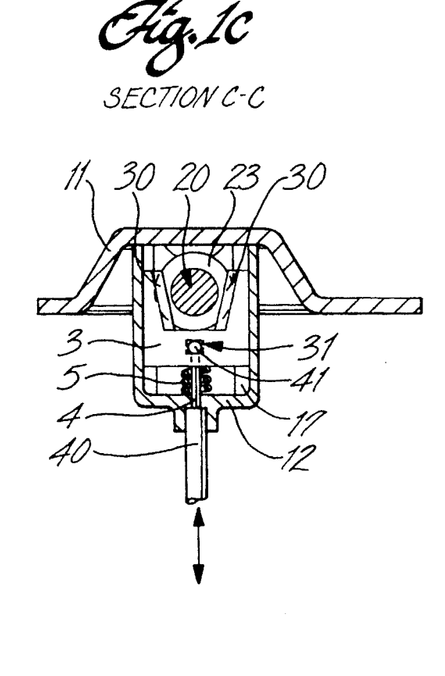
FIG. 1c is a semi-schematic front view of an embodiment of a quick adjustment device taken along section C—C in FIG. 1b.

As shown in FIGS. 1b and 1c, the wedge-shaped edges 30 of slide 3 is allowed to frictionally engage the angularly disposed wedge-shaped edges 23 of the locking section of the worm 2 by means of the radial displacement of the slide 3 along the guide surfaces 17. By means of the activation of an actuating device 40, for example a handle or the like, a cable 4 is tightened against the force of the helical spring 5 positioned between the housing 12 and the slide 3. The cable 4 may comprise a Bowden wire or the like. The tightening of the cable releases the engagement between the worm 2 and the slide 3 via the cable nipple 41 fastened in the cable suspension 31. Accordingly, the rotation of the worm and the adjustment of the particular article, i.e., the backrest of the seat, is achieved via the exertion of a tension force on the cable 4. If no force acts on the cable 4 from the activation device 40, the helical spring 5, which is supported on the housing 22, again pushes the slide into the locking region of the worm 2, so that any further adjustment movement is blocked.

The above described continuously acting quick adjustment device is distinguished by a high degree of functional reliability, since even in case of a crash an adjustment movement which is being performed, i.e. when the engagement between the slide 3 and the worm 2 is released, is interrupted when the front faces 24 of the worm 2 comes into engagement with the support surfaces 16 of the housing 12 as a result of the crash force, resulting in self-locking of the worm 2. The reason for the axial displacement of the worm lies in the longitudinal force caused by the sudden acceleration of the worm, which has a high mass moment of inertia, with respect to the housing.

Figure 2:
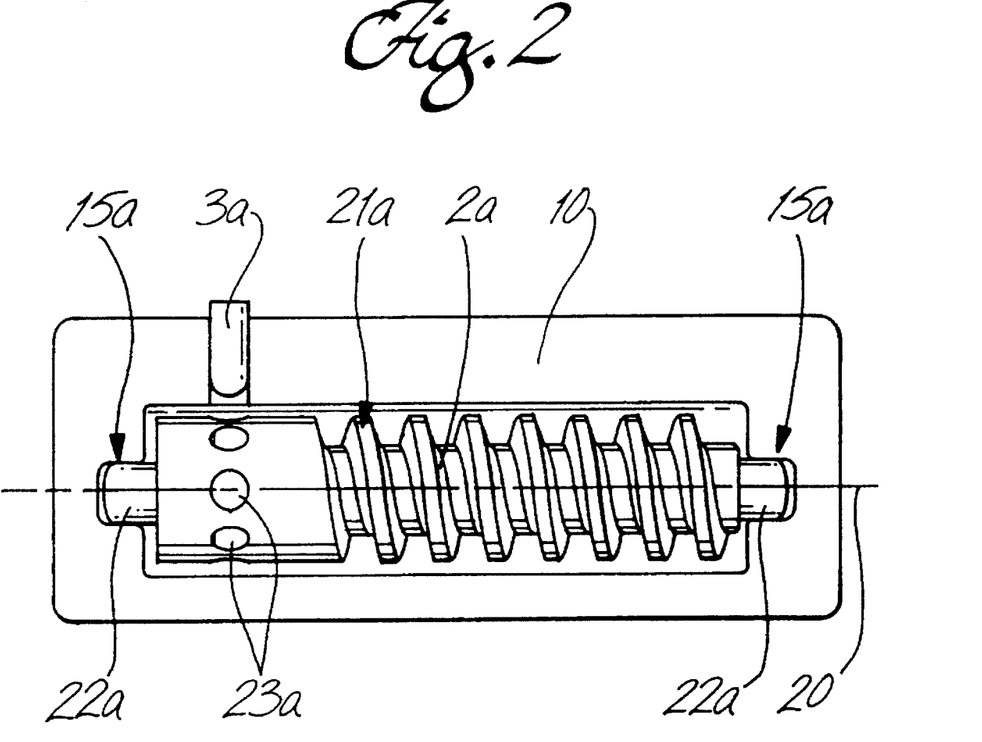
FIG. 2 is a semi-schematic side view of an embodiment a quick adjustment device with interlocking engagement of the locking region with the slide.

A further exemplary embodiment which provides interlocking and finely graduated locking of the worm 2a is illustrated in FIG. 2. Radial bearings 15a are worked into opposite ends of the housing 10 in which journals 22a of the worm 2a are seated. A toothed section of an toothed segment lever (not shown) engages the toothed section 21a of the worm. The worm comprises a locking region comprising a cylindrical section at one end of the worm 2a having a plurality of radially directed recesses 23a which can be engaged by a slide embodied as a bolt 3a the resides within the housing 10 and oriented perpendicular to the worm 2a. Actuation of the bolt 3a can be provided in a manner similar to the slide 3 previously illustrated and described in FIGS. 1a to 1c.

In accordance with the illustration in FIG. 2, the quick adjustment device is positioned in the released position, i.e., the bolt 3a is not engaged within a recess 23a and the worm 2a can freely turn, which is a requirement for an adjustment movement. When positioned in the locked position, the bolt 3a engages one of the recesses 23a and blocks the rotational movement of the worm 2a. Should the bolt 3a be placed on a land between the recesses 23a, an almost unnoticeable movement of the part to be adjusted (for example the backrest of a seat) would lead to the turning of the worm 2a until the bolt coincides with the next adjacent recess 23a because of the fine graduation of the quick adjustment device.

The advantage of the embodiment illustrated in FIG. 2 lies in the absolutely assured blocking of the quick adjustment device by the interaction between the bolt 3a and a recess 23a even under extreme conditions such as vibrations and the like.

Figure 3:
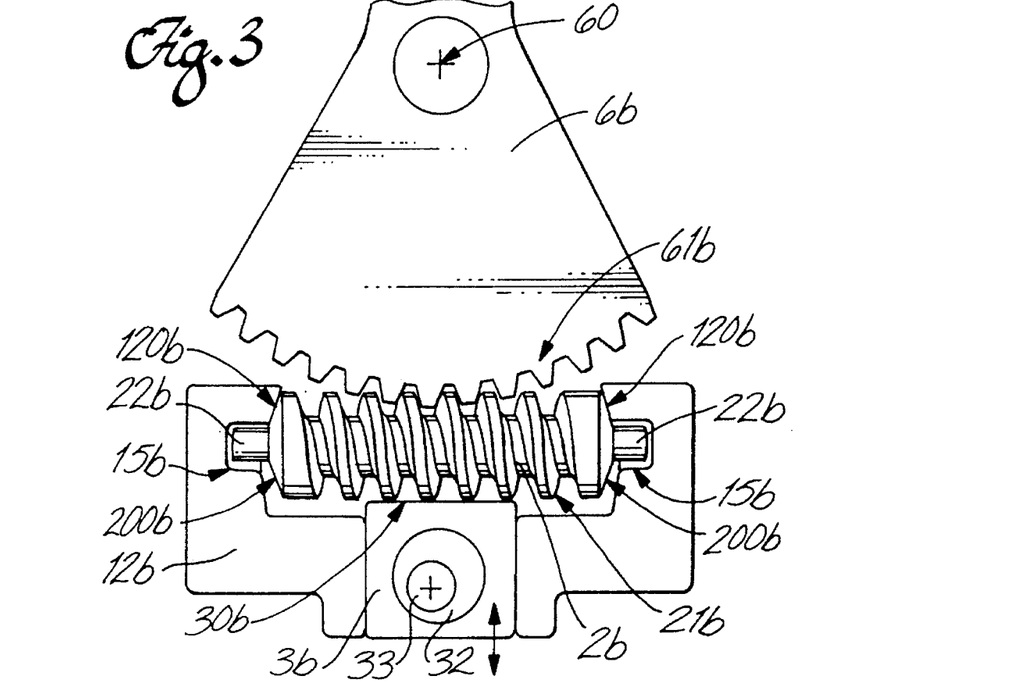
FIG. 3 is a semi-schematic side view of an embodiment of a quick adjustment device with two locking regions.

FIG. 3 illustrates a further exemplary embodiment of the quick adjustment device constructed according to principles of this invention. In this embodiment the toothed segment lever 6b, which is pivotable around the shaft 60, engages with its toothed section 61b the toothed section 21b of the worm 2b. The worm 2b is seated in a housing 12b having an opening at a top portion to accommodate the placement of the toothed segment lever 6b therethrough. The housing comprises a pair of integral seats 15b positioned at opposite ends that accommodate the placement of worm journals 22b therein.

A slide 3b is disposed within the housing adjacent to the toothed section 21b of the worm 2b opposite to the toothed section 61b of the toothed segment lever 6b. The slide can be displaced within the housing in accordance with the directional arrows by means of an eccentric which comprises a displacement cam 32 seated on a guide bolt 33. Like the exemplary embodiments previously described, an actuation device connected to the displacement cam provides the required adjusting forces. In this embodiment, a locking region of the worm is configured as the front faces of the toothed section 21b of the worm located adjacent to a frictional surface 30b of the slide 3b. Accordingly, the rotation of the worm 2b is blocked by the rotation of the displacement cam 32, causing the slide 30b to frictionally engage the front faces of the toothed section of the worm.

A second locking region of the worm 2b is formed by conical front faces 200b positioned adjacent the end portions of the toothed section of the worm 2b. The conical front faces 200b can come into engagement with complementary shaped edge portions 120b of the housing 12b when the worm 2b is radially displaced by the action of the slide 3b in a direction toward the toothed segment lever 6b. FIG. 3 shows the quick adjustment device in a locked position with the frictional surface 30b pressed against the front face of the toothed section 21b of the worm. In the course of this interaction between the worm and slide, an engagement between the conical front faces 200b and the edges 120b is simultaneously provided. Accordingly, the rotational movement of the worm 2b is provided by the simultaneous actions of both locking regions.

This embodiment is preferably equipped with a resilient centering means to prevent play of the worm 2b and to assure that blockage is allowed to take place in the release position if particularly large forces act on the part to be adjusted, i.e., during a collision or the like. In such an event the worm 2b is pressed (depending on the load direction of the part to be adjusted) with its conical front face (edge 200b) against the edge 120b of the housing 12b and the adjustment movement is interrupted. The advantage of this embodiment of the quick adjustment device lies in particular in its simple structural design.

Figure 4A:
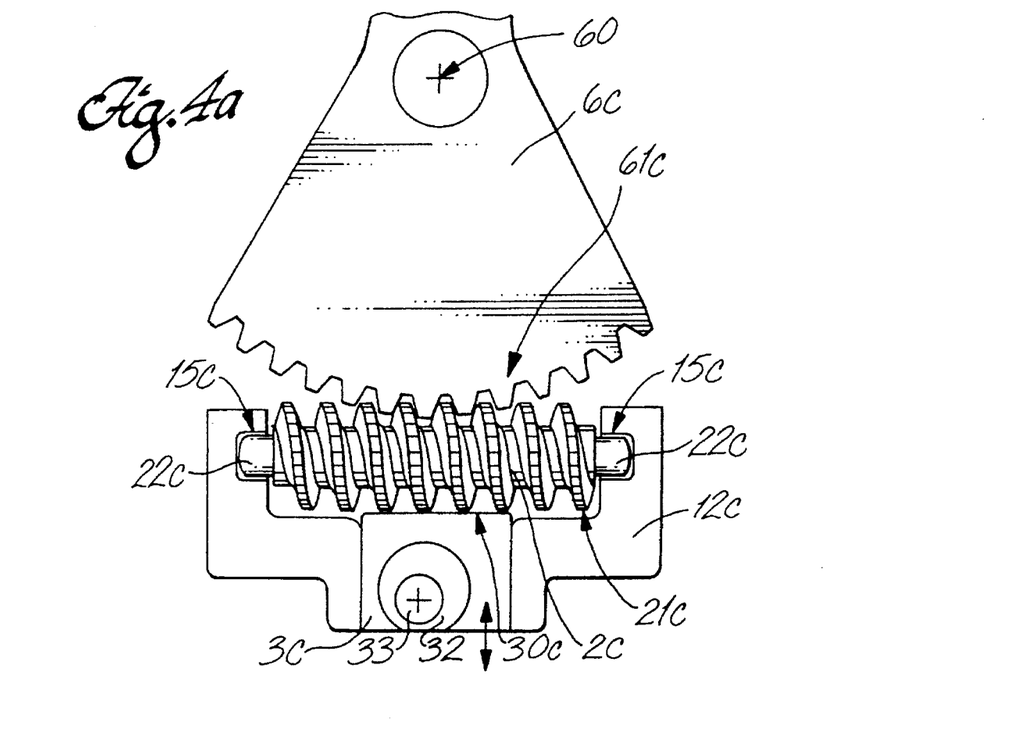
FIG. 4a of is a semi-schematic side view of an embodiment of a quick adjustment device with a micro-toothed area on the front region of the toothed section of the worm.
Figure 4B:
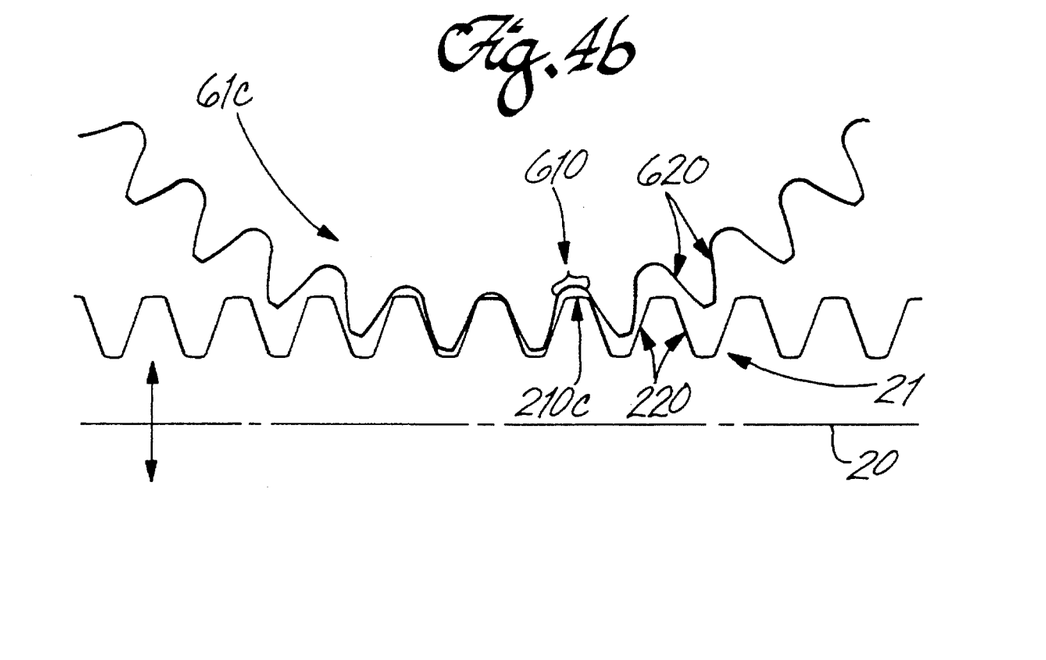
FIG. 4b is an exploded view of a portion of FIG. 4a illustrating the worm in a locked position against a toothed element caused by radial displacement of the worm.
Figure 4C:
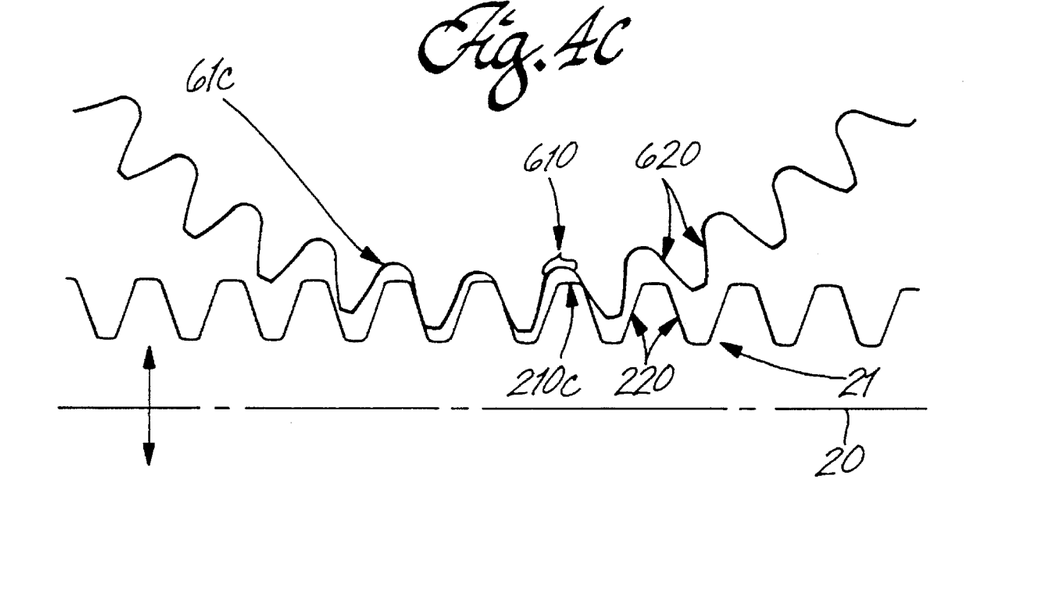
FIG. 4c is an exploded view of a portion of FIG. 4a illustrating the worm in a non-locked operating position engaged with the toothed element.

FIGS. 4a through 4c illustrate another exemplary embodiment of the quick adjustment device constructed according to principles of this invention. This embodiment is similar to embodiment illustrated in FIG. 3 except that no locking region exists between the edges of the housing and the conical front faces of the worm 2c. Instead, referring to FIG. 4a, a second locking region is provided by a special design of the toothed section 61c of the toothed segment lever 6c. As shown in FIG. 4b, a base portion 610 of the toothed section 61c of the toothed segment lever 6c is embodied in such a way that when the toothed segment lever 6c is placed under load in the locked position, by the frictional engagement of the slide 3c against front faces 210c of the toothed section of the worm 2c, a large radial force component is created, which in connection with the slide 3c results in very strong self-locking of the worm 21c. The radial force is believed to be created by the large angle of contact that exists between the surfaces 610 and 210c, best shown in FIG. 4b. To assure the above-mentioned engagement, bearing seats 15c are configured within the housing to accommodate a sufficient amount of play for the necessary radial displacement of the worm.

In FIG. 4c the quick adjustment device is illustrated in the released position to accommodate the adjustable movement of the toothed segment lever 6c. Accordingly, tooth edges 220 of the worm and toothed edges 620 of the toothed segment lever 6c are allowed to mesh with the toothed sections 21 and 61c in the usual manner, because the slide 3c has been released and the worm axis 20 has taken up a larger distance from the pivot shaft 60.

Referring back to FIG. 4a, an embodiment of the quick adjustment device is illustrated having an surface configuration of enhanced friction characteristics. Specifically, a micro-toothed area schematically indicated on the front face of the toothed section 21c of the worm 2c. The micro-toothed area is intended to increase the frictional effect on the friction face 30c of the slide 3c and, thereby enhance the blocking effectiveness between the slide and the worm. If desired, the friction surface 30 may also be configured having a micro-toothed area to optimize frictional interaction between the slide and the worm.

Figure 5:
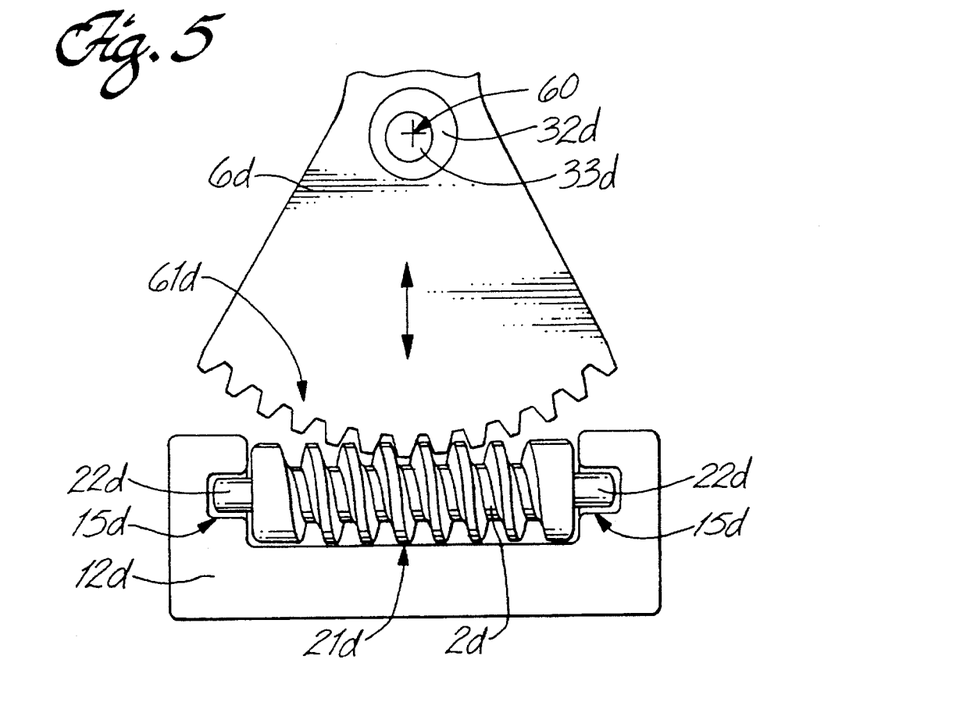
FIG. 5 is a semi-schematic side view of an embodiment of a quick adjustment device having a tooth segment lever that is radially displacable with respect to a worm gear to effect locking interaction therebetween.
Figure 6:
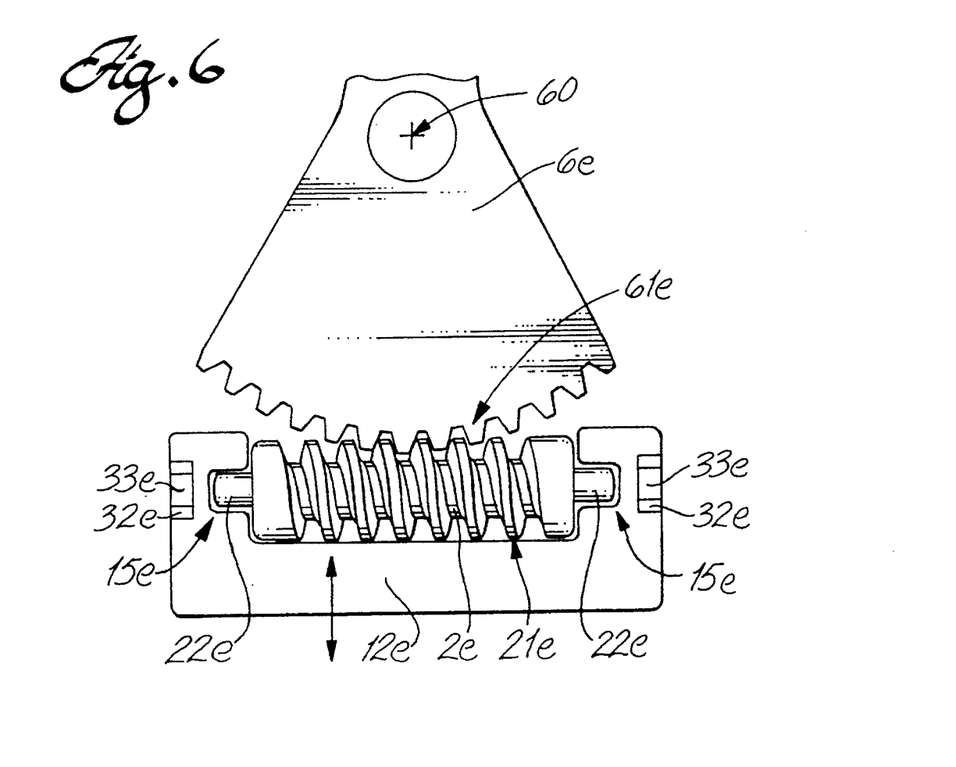
FIG. 6 is a semi-schematic side view of an embodiment of a quick adjustment device having a worm gear that is radially displacable to effect locking interaction with a toothed segment lever.

FIGS. 5 and 6 illustrate still other exemplary embodiments of the quick adjustment device constructed according to principles of this invention that correspond to the structural design shown in FIG. 3 comprising a rotatable toothed segment lever 6d and 6e, a rotatable worm 2d and 2e, and a housing 12d and 12e to support each respective worm. Common in the embodiments shown in FIGS. 5 and 6 is the use of a non-self-locking worm 2d and 2e, the toothed section 21d and 21e of which is in engagement with the toothed section 61d and 61e of the toothed segment lever 6d and 6e. However, each embodiment differs in the selection of the member that acts as the locking element to block movement of the worm drive and, therefore, block operation of the displacement mechanism. In connection with the embodiments illustrated in FIGS. 5 and 6, no separate locking elements (such as in FIGS. 1 to 4) are shown, instead, components of the mechanism of the quick adjustment device itself are used as the locking element.

Referring to FIG. 5, an eccentric is disposed on the shaft 60 that is used to pivotally connect the toothed segment lever 6d. The eccentric comprises a guide bolt 33d and a displacement cam 32d disposed around the bolt and which, when it is actuated, causes a radial displacement of the toothed segment lever 6d in a direction toward the worm 2d. In the process, the toothed segments 21d and 61d are pushed into each other, so that self-locking occurs and operation of the quick adjustment device is blocked.

Referring to FIG. 6, the worm 2e, rather than the toothed segment lever, is used as the locking element. For this purpose, eccentrics 32e and 33e are disposed on the sides of the housing 12e and are attached around the shaft of the worm 2e. In the course of actuation, the eccentrics are moved radially about the worm shaft, pushing the worm shaft and the worm 2e away from the housing 12e and pushing the toothed segments 21e and 61e into each other, so that self-locking occurs and operation of the quick adjustment device is blocked.

The disclosure of attached German patent applications Serial No. P 43 38 737.7, filed on Nov. 12, 1993, and German patent application Serial No. P 44 22 529.6, filed on Jun. 28, 1994, are incorporated fully herein by reference. Priority of these German applications is claimed.

Although limited embodiments of the quick adjustment device have been specifically described and illustrated herein, many modifications and variations will be apparent to those skilled in the art. Accordingly, it is to be understood that, within the scope of the appended claims, the quick adjustment device constructed according to principles of this invention may be embodied other than as specifically described herein.

What is claimed is:

1. A manual quick adjustment device for adjusting elements in or on motor vehicles without a separate drive unit, the quick adjustment device comprising:

a housing;

a worm having a toothed section along a circumferential surface, the worm being rotatably disposed within the housing and having at least one locking region;

a toothed segment lever oriented opposite to the worm having a toothed section engaging the toothed section of the worm; and a locking element disposed within the housing, the locking element being configured to engage the locking region of the worm to prevent rotational movement of the worm;

wherein the worm is rotated in the housing when a force is imposed on the toothed segment lever and when the locking element is not engaged with the locking region of the worm;

wherein rotation of the worm is prevented by engagement of the locking element with the locking region of the worm; and wherein the device is adapted so that a force imposed on the toothed segment, when the locking element is engaged with a locking region lever, is directed to the locking region.

2. The quick adjustment device as recited in claim 1 wherein the locking element comprises a slide configured to frictionally engage the locking region of the worm.

3. The quick adjustment device as recited in claim 2 wherein the slide is guided in the housing and is connected to an actuating element.

4. The quick adjustment device as recited in claim 2 wherein the locking region is disposed along a circumference of one end of the worm, in respect to which the slide is radially movably seated.

5. The quick adjustment device as recited in claims 2, 3, or 4 wherein the locking region of the worm comprises at least one wedge-shaped circumferential edge to which at least one correspondingly oriented edge of one of the slide and the housing are assigned.

6. A manual quick adjustment device for adjusting elements in or on motor vehicles without a separate drive unit, the quick adjustment device comprising:

a housing;

a worm having a toothed section along a circumferential surface, the worm being rotatably disposed within the housing and having a locking region;

a toothed segment lever oriented opposite to the worm having a toothed section engaging the toothed section of the worm; and a slide configured to frictionally engage the locking region to prevent the worm from rotating, wherein the slide is guided in the housing and is connected to an actuating element, wherein the actuating element comprises a Bowden wire controlled by a handle, and wherein a prestressed spring is supported between the slide and an inner wall of the housing to maintain the slide in frictional engagement with the locking region.

7. The quick adjustment device as recited in claim 3 wherein the actuating element is an eccentric member acting on the slide, the eccentric member being connected to a handle.

8. The quick adjustment device as recited claim 2 wherein the locking region comprises a front face portion of the toothed section of the worm.

9. The quick adjustment device as recited in claim 8 wherein the slide comprises a friction face configured to frictionally engage the front face, and wherein one of the front face and the friction face having a surface configuration with a high coefficient of friction.

10. The quick adjustment device as recited in claim 1 wherein the locking region of the worm is in the form of conical front faces positioned adjacent to end portions of the toothed section of the worm, the conical front faces being positioned adjacent to complementary shaped edge portions of the housing, the conical front faces and the edge portions being pressed into engagement by radial displacement of the worm.

11. The quick adjustment device as recited in claim 2 wherein the slide is in interlocking engagement with the locking region.

12. The quick adjustment device as recited in claim 1 wherein the worm comprises a further locking region embodied as conical front faces positioned adjacent to end portions of the toothed section of the worm, the conical front faces being positioned adjacent to complementary shaped edge portions positioned within the housing, the conical front faces and the edge portions being pressed into engagement by radial displacement of the worm within the housing.

13. A manual quick adjustment device for adjusting elements in or on motor vehicles without a separate drive unit, the quick adjustment device comprising:

a housing;

a worm having a toothed section along a circumferential surface, the worm being rotatably disposed within the housing; and a toothed segment lever pivotally mounted adjacent the worm and oriented in perpendicular relation to the worm, wherein the toothed segment lever has a toothed section that engages the toothed section of the worm, wherein the worm is rotated in the housing by pivotal movement of the toothed segment lever, wherein the toothed segment lever is displacable in a direction perpendicular to the worm, and wherein displacement of the toothed segment lever against the worm causes the lever to act as a locking element to prevent rotational movement of the worm.

14. The quick adjustment device as recited in claim 13 wherein the toothed segment lever is pivotally mounted on an eccentric member disposed around a shaft, and wherein rotation of the eccentric member about the shaft causes the toothed section of the toothed segment lever to push against the toothed section of the worm and prevent rotational movement of the worm.

15. A manual quick adjustment device for adjusting elements in or on motor vehicles without a separate drive unit, the quick adjustment device comprising:

a housing;

a worm having a toothed section along a circumferential surface, the worm being rotatably disposed within the housing, wherein the worm is radially displacable within the housing; and a toothed segment lever pivotally mounted adjacent the worm and oriented in perpendicular relation to the worm, wherein the toothed segment lever has a toothed section that engages the toothed section of the worm, and wherein the worm is radially displacable in a direction toward the toothed segment lever to act as a locking element to prevent rotational movement of the worm.

16. The quick adjustment device as recited in claim 15 wherein the worm is rotationally mounted on a shaft and at least one eccentric member is interposed around the shaft, and wherein rotation of the eccentric member about the shaft causes the toothed section of the worm to push against the toothed section of the toothed segment lever and prevent rotational movement of the worm.

17. A manual quick adjustment device for adjusting elements in or on motor vehicles without a separate drive unit, the quick adjustment device comprising:

a housing;

a worm having a toothed section along a circumferential surface, the worm being rotatably disposed within the housing and having a locking region;

a toothed segment lever oriented opposite to the worm having a toothed section engaging the toothed section of the worm; and a slide configured to frictionally engage the locking region to prevent the worm from rotating, wherein the worm comprises a further locking region embodied as conical front faces positioned adjacent to end portions of the toothed section of the worm, the conical front faces being positioned adjacent to complementary shaped edge portions positioned within the housing, the conical front faces and the edge portions being pressed into engagement by radial displacement of the worm within the housing.

18. A manual quick adjustment device for adjusting elements in or on motor vehicles without a separate drive unit, the quick adjustment device comprising:

a housing;

a worm having a toothed section along a circumferential surface, the worm being rotatably disposed within the housing and having a locking region;

a toothed segment lever oriented opposite to the worm having a toothed section engaging the toothed section of the worm; and a slide configured to frictionally engage the locking region to prevent the worm from rotating, wherein the slide is guided in the housing and is connected to an eccentric member acting on the slide, the eccentric member being connected to a handle, wherein the actuating element, wherein the worm comprises a further locking region embodied as conical front faces positioned adjacent to end portions of the toothed section of the worm, the conical front faces being positioned adjacent to complementary shaped edge portions positioned within the housing, the conical front faces and the edge portions being pressed into engagement by radial displacement of the worm within the housing.

* * * * *

UNITED STATES PATENT AND TRADEMARK OFFICE
CERTIFICATE OF CORRECTION

PATENT NO. : 5,590,562
DATED : January 7, 1997
INVENTOR(S) : Georg Scheck; Carsten Brandt; Markus Fischer;
Jürgen Angermüller; Hans Rampel; Udo Dreher It is certified that error appears in the above-indentified patent and that said Letters Patent is hereby corrected as shown below:

Column 2, line 65, after "embodiment" insert -- of --.
Column 3, line 3, delete "of" (first occurrence).
Column 3, line 18, change "displacable" to -- displaceable --.
Column 4, line 20, change "is" to -- are --.
Column 4, line 54, change "an" to -- a --.
Column 4, line 59, change "the" to -- that --.
Column 6, line 3, after "similar to" insert -- the --.
Column 6, line 32, change "an surface" to -- a surface --.
Column 8, line 61, change "displacable" to -- displaceable --.
Column 9, line 12, change "displacable" to -- displaceable --.
Column 9, line 18, change "displacable" to -- displaceable --.
Column 10, lines 25, 26 , after "handle," delete "wherein the actuating element,".

Signed and Sealed this

Twelfth Day of May, 1998

*Attest:*

BRUCE LEHMAN

*Attesting Officer*    Commissioner of Patents and Trademarks